United States Patent

Graf et al.

Patent Number: 5,957,990
Date of Patent: Sep. 28, 1999

[54] CONTROLLER FOR A DEVICE IN A MOTOR VEHICLE

[75] Inventors: Friedrich Graf; Frank Lohrenz, both of Regensburg, Germany

[73] Assignee: Siemens Aktiengesellschaft, Munich, Germany

[21] Appl. No.: 08/996,369

[22] Filed: Dec. 22, 1997

Related U.S. Application Data

[63] Continuation of application No. PCT/DE96/01028, Jun. 12, 1996.

[30] Foreign Application Priority Data

Jun. 20, 1995 [DE] Germany ............................ 195 22 348

[51] Int. Cl.$^6$ ................ G06F 7/70; G06F 19/00
[52] U.S. Cl. .................................... 701/57; 701/61
[58] Field of Search ................... 701/51, 61, 57, 701/68, 70

[56] References Cited

U.S. PATENT DOCUMENTS

| | | | |
|---|---|---|---|
| 5,036,730 | 8/1991 | Sakai et al. | 701/57 |
| 5,366,416 | 11/1994 | Roovers et al. | 474/18 |
| 5,620,393 | 4/1997 | Minowa et al. | 477/143 |
| 5,638,277 | 6/1997 | Nagai | 701/70 |

FOREIGN PATENT DOCUMENTS

| | | |
|---|---|---|
| 0622570A1 | 4/1993 | European Pat. Off. . |
| 0576703A1 | 1/1994 | European Pat. Off. . |
| 0626527A1 | 11/1994 | European Pat. Off. . |
| 0638742A1 | 2/1995 | European Pat. Off. . |
| 93/23689 | 11/1993 | WIPO . |
| 95/20114 | 7/1995 | WIPO . |

*Primary Examiner*—Virna Lissi Mojica
*Attorney, Agent, or Firm*—Herbert L. Lerner; Laurence A. Greenberg

[57] ABSTRACT

A controller for a motor vehicle device, such as a transmission. The transmission ratio is automatically controlled in dependence on at least the accelerator pedal position and the driving speed, using stored characteristic maps. A fuzzy logic circuit has at least one rule base. Various signals, which characterize driving states and the load state of the motor vehicle, are evaluated by the fuzzy logic circuit and control signals are generated in response. The control signals define the transmission ratio. At a predefined dynamic driving state, an additional control signal is generated by the fuzzy logic circuit, by means of which signal a change to the transmission ratio is carried out. That change is independent of the respective characteristic map. Dynamic driving states of this type are, for example, the occurrence of an impermissible wheel brake slip or driving down relatively long downhill gradients.

11 Claims, 3 Drawing Sheets

| CONCLUSION | STATE n | STATE n+1 | CONTROLLED VARIABLES |
|---|---|---|---|
| ≥ b | A | B | GEAR (n+1) =GEAR (n)-1 |
| ≤ d | B | A | GEAR (n+1) =GEAR (n)+1 |

CONTROLLER FOR A DEVICE IN A MOTOR VEHICLE

CROSS-REFERENCE TO RELATED APPLICATION

This is a continuation of international application Ser. No. PCT/DE96/01028, filed Jun. 12, 1996.

BACKGROUND OF THE INVENTION

Field of the Invention

The invention relates to a controller for a device in a motor vehicle, in particular for a motor vehicle transmission, by means of which the transmission ratio is automatically controlled in dependence on at least the accelerator pedal position and the driving speed, using stored characteristic maps or fields, and which has a fuzzy logic circuit with a rule base, by means of which the various signals characterizing driving states and the load state of the motor vehicle are evaluated and control signals are then generated which define the transmission ratio. Such a controller can be used in a motor vehicle, for example for controlling an automatic transmission, rear-wheel steering, traction control or a driving speed controller.

In prior art transmission controls for motor vehicles, the transmission ratio of the transmission is automatically set as a function of the accelerator pedal position and of the driving speed, using stored characteristic maps or fields. At the same time, various driving parameters and operating states of the motor vehicle are taken into account (see, for instance, European patent applications EP-A 0576703, EP-A 0622570, EP-A 0626527, EP-A 0638742). The selection of the gear to be shifted in each case or—in the case of continuously variable transmissions—the transmission ratio to be set is performed by control circuits which operate in accordance with the methods of fuzzy logic. Using this logic, expert knowledge which has been obtained through experience is described in the form of a so-called rule base and hence used for the open-loop or closed-loop control operations of the motor vehicle transmission. Control signals are generated, for example a load signal and a driver recognition signal, which effect a changeover of the characteristic map, as well as gear-shifting blocking signals which prevent shifts which are brought about by gear-shifting characteristic maps, but could lead to dynamically unfavorable driving states (for example to a risk of skidding).

In certain dynamic driving states it may also be expedient to shift up or down—or to appropriately adjust the transmission ratio—which would not be brought about by the gear-shifting or actuating characteristic map that is active at present. Examples of such dynamic driving states are the occurrence of inadmissible wheel brake slip or driving down relatively long downhill gradients.

SUMMARY OF THE INVENTION

It is accordingly an object of the invention to provide a motor vehicle device controller, which overcomes the above-mentioned disadvantages of the heretofore-known devices and methods of this general type and which also takes such dynamic driving states into account.

With the foregoing and other objects in view there is provided, in accordance with the invention, a motor vehicle transmission control for automatically controlling a transmission ratio in dependence on at least an accelerator pedal position and a driving speed of the motor vehicle, comprising:

a memory having characteristic maps stored therein;

a fuzzy logic circuit connected to the memory, the fuzzy logic circuit having a rule base for evaluating various signals characterizing driving states and a load state of the motor vehicle, the fuzzy logic circuit outputting control signals defining a transmission ratio of the motor vehicle transmission;

the fuzzy logic circuit, upon detecting a predetermined dynamic driving state of the motor vehicle, outputting a control signal for changing a gear ratio independently of a respective characteristic map; and the fuzzy logic circuit including in the control signal information about a priority of a change in the gear ratio to be effected.

In accordance with an added feature of the invention, the fuzzy logic circuit, upon detecting wheel slip, generates a control signal effecting an upward shift in the transmission or a control signal effecting a reduction in the transmission ratio.

In accordance with an additional feature of the invention, the fuzzy logic circuit, upon detecting downhill driving of the motor vehicle, generates a control signal effecting a downward shift in the transmission, or a control signal effecting an increase in the transmission ratio.

In accordance with a further feature of the invention, there is provided a timer for maintaining the control signal generated by the fuzzy logic circuit for a predetermined period of time.

There is also provided, in accordance with the invention, a signal conditioning circuit receiving signals from the motor vehicle and outputting conditioned signals to the fuzzy logic circuit, and a timer chronologically influencing predetermined input signals of the signal conditioning circuit.

In accordance with a concomitant feature of the invention, the fuzzy logic circuit receives signals representing a manual gear specification or gear selection by a driver of the motor vehicle, and wherein the fuzzy logic circuit is programmed to evaluate the driver-generated signals and in response thereto issue the control signals for adjusting the gear ratio.

The primary advantage of the invention resides in the low additional cost which it requires. All the circuit components and sensor signals which are already present in the controllers known from the above-mentioned patent disclosures can be used in the context of this invention. Furthermore, no additional sensors are necessary. Only some additional memory content and a few further fuzzy rules need to be employed.

With the above and other objects in view there is therefore also provided, in accordance with a more general aspect of the the invention, a controller for a device in a motor vehicle, comprising:

a memory having characteristic maps stored therein;

a fuzzy logic circuit connected to the memory, the fuzzy logic circuit having a rule base for evaluating various signals characterizing driving states and a load state of the motor vehicle, the fuzzy logic circuit outputting control signals defining a controlled variable of the motor vehicle;

the fuzzy logic circuit, upon detecting a predetermined dynamic driving state of the motor vehicle, outputting a control signal for changing a controlled variable independently of a respective characteristic map; and the fuzzy logic circuit including in the control signal information about a priority of a change in the controlled variable to be effected.

Other features which are considered as characteristic for the invention are set forth in the appended claims.

Although the invention is illustrated and described herein as embodied in a controller for a device in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
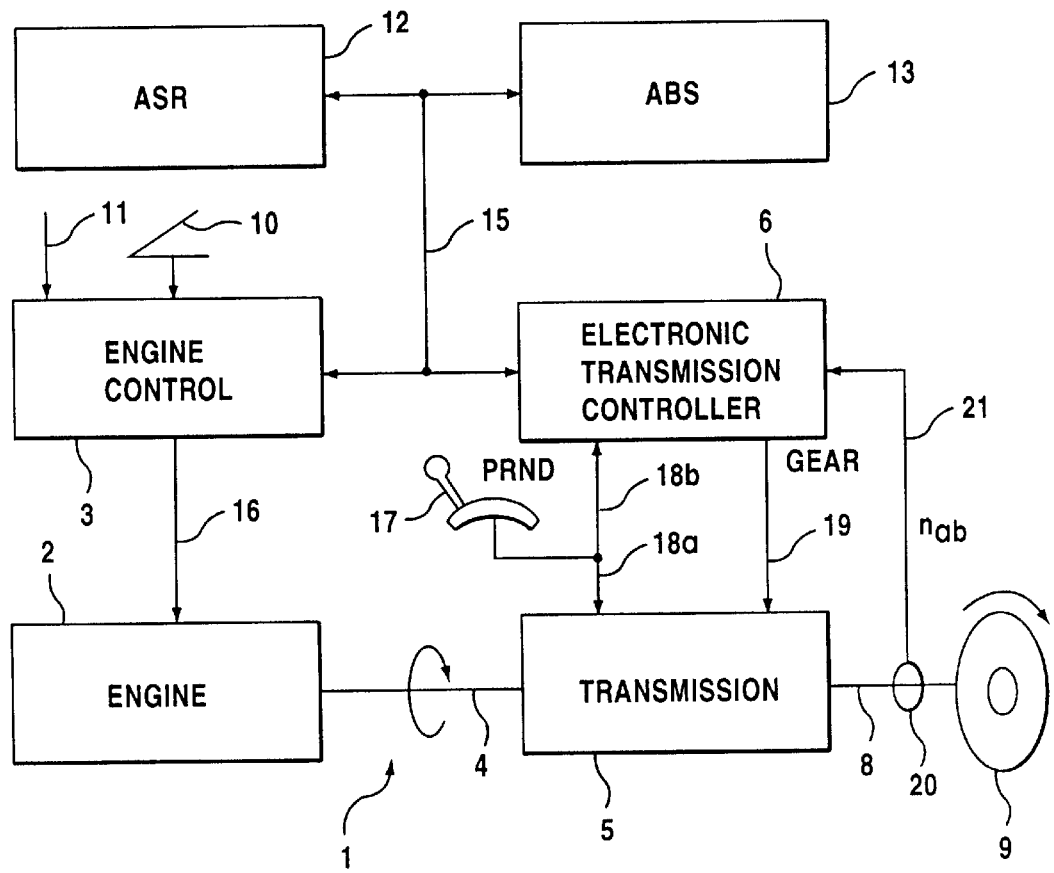
FIG. 1 is a schematic view of the essential components of a motor vehicle with a controller according to the invention.

Referring now to the figures of the drawing in detail and first, particularly, to FIG. 1 thereof, there is seen a motor vehicle 1 with an engine 2 that is controlled by an engine control 3. An engine output shaft 4 is connected—via a non-illustrated torque converter—to an automatic transmission 5.

The transmission 5 is controlled by an electronic transmission controller 6 according to the invention. In the following exemplary embodiment, the transmission 5 is designed as a stepped transmission, but a controller 6 according to the invention can be used equally well for a continuously variable transmission—or for controlling the further devices mentioned at the beginning in a motor vehicle. A transmission output shaft 8 is connected to the driven axle of the motor vehicle, which is symbolized here by a driven wheel 9.

The driver of the motor vehicle issues his or her commands to the engine control 3—strictly speaking, his or her wishes with regard to the vehicle performance—via an accelerator pedal 10. When a non-illustrated brake pedal is actuated, a braking signal, generated for example by the brake-light switch, passes via a signal line 11 to the engine control 3. The motor vehicle is additionally provided with a wheel-slip or traction control system (ASR) 12 and an antilock brake system (ABS) 13, which are connected to one another and to the engine control 3. They are furthermore connected to the transmission controller 6 by signal lines 15 for the purpose of exchanging signals. Via a signal line 16, the engine control 3 sends to the engine 2 signals with which the ignition, the injection and the throttle are controlled (the latter only if an appropriate control device is present).

The driver determines the driving range of the automatic transmission 5 in the usual way via a transmission selector lever 17. The transmission selector lever signals pass via a mechanical connection 18a to the transmission 5 and via an electric signal line 18b to the controller 6. Via a signal line 19, the controller 6 sends control signals to the transmission 5, these signals defining the respective transmission gear and controlling the required shifting operations or, in the case of a continuously variable transmission, setting the respective transmission ratio. The rotational speed of the transmission output shaft 8 is reported to the controller 6 via a signal line 21 by a rotational speed sensor 20. At least the signal lines 15, which connect the control devices 3, 6, 12 and 13 to one another, may comprise individual signal lines or a bidirectional bus, for example a known CAN bus or LAN bus. The control devices and systems 3, 12 and 13 do not have to be present. However, if they are present it is advantageous if the transmission controller 6 can access the sensor signals supplied by said control devices and systems (for example for the wheel rotational speeds) and variables derived therefrom.

Figure 3:
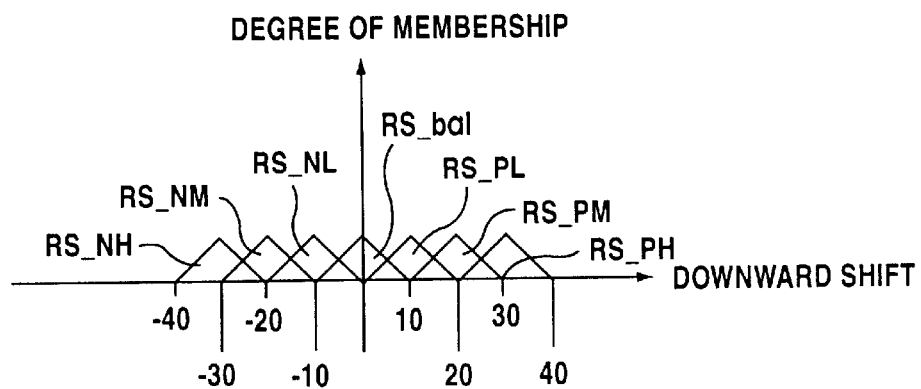
FIG. 3 is a graph showing membership functions of the output signal of a fuzzy logic circuit of the transmission controller according to FIG. 2.
Figure 2:
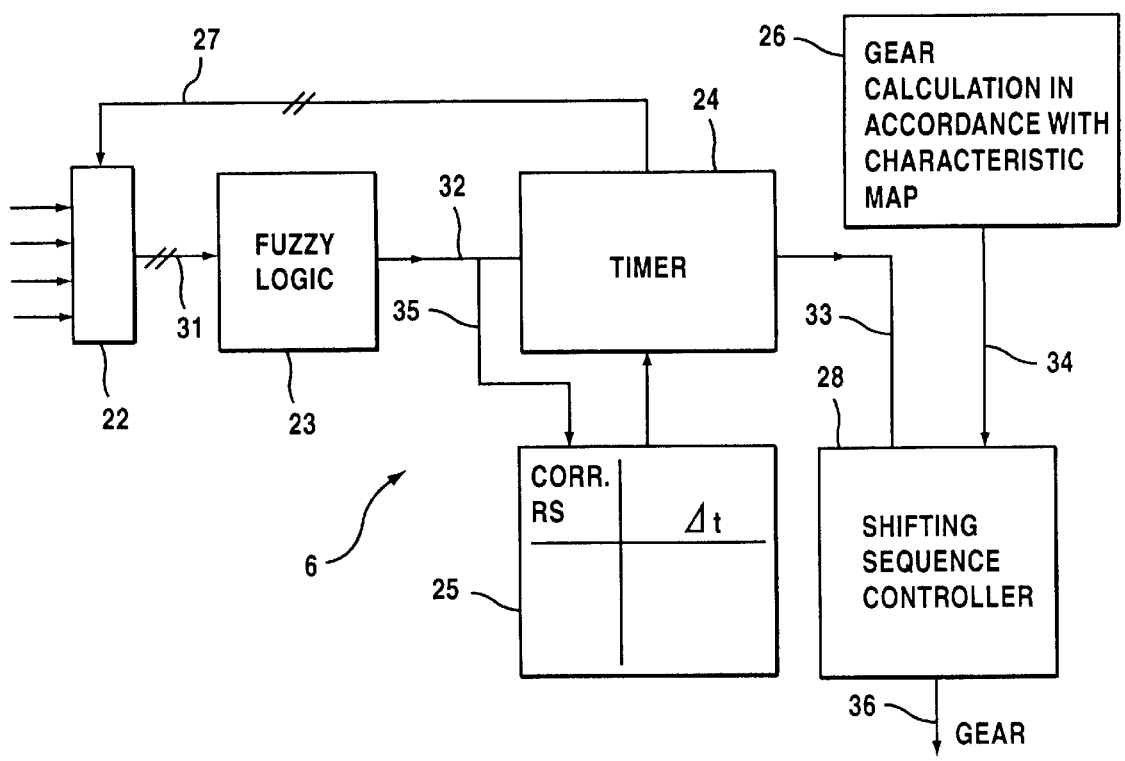
FIG. 2 is a block diagram of the transmission control of the motor vehicle according to FIG. 1.

With reference to FIG. 3, membership functions are processed in a fuzzy logic circuit, which will be described in the following text. The illustration in FIG. 3 shows the membership function of an output variable of the fuzzy logic circuit 23, specifically the degree of membership of the necessity for a downward shift RS to the following fuzzy values: NH=negative high (i.e., very negative), NM=negative medium, NL=negative low, PL=positive low, PM=positive medium, PH=positive high. These degrees of membership RS_NH and so on are the results of the fuzzy rules processed in the fuzzy logic circuit and constitute the relevance of the rules. The combined result of a plurality of these rules in relation to an output variable results, for example, from a defuzzification carried out in accordance with the area center of gravity method. Positive abscissa values mean that a downward shift is initiated, negative values mean that it is forbidden. The value RS_bal corresponds to the so-called balance rule, which becomes effective when none of the other rules is active, specifically in order to prevent undefined states.

Referring now to FIG. 3, the transmission controller 6 has the following components: a signal conditioning circuit 22 (abbreviated to signal conditioning 22 in the following), a fuzzy logic circuit 23 (also designated fuzzy logic 23 in the following) 23, a timer 24, a table 25, a gear calculation circuit 26 and a shifting sequence controller 28. These components are described in detail in the above-mentioned European patent applications, the disclosures of which are herewith incorporated by record. The individual components will thus be explained herein only in terms of their respective function. The timer 24 is connected to the signal conditioning circuit 22 via a feedback line 27. The gear calculation circuit 26 selects the gear to be respectively engaged or the transmission ratio to be selected in a known way using shifting or actuating characteristic maps (performance graphs). In the table 25, the various values of the necessity to shift down RS, that is to say the fuzzy conclusions, are for example allocated the following time values.

| corrected RS | time value Δt |
|---|---|
| RS_PL | ∞ |
| RS_NH | 3 s |
| RS_NL | 0 |

The dynamic shifting correction described in European patent application EP 93106831.6 (incorporated by reference) for an automatic transmission controller with a fuzzy system is improved and supplemented as follows by the present controller.

The "shift" signal (shifting up and shifting down, respectively) intervenes not only to prevent transmission shifts which are initiated by shifting or actuating characteristic maps, but also brings about shifts that are independent of the characteristic maps. This may be expedient in the case of specific dynamic driving states in which an upward shift or downward shift is not triggered by the active shifting characteristic map. Examples are the occurrence of brake slip, in which an upward shift is initiated, or traveling down a (steep) downhill gradient, in which the braking action is improved by a downward shift, that is to say braking support for the driver is provided.

This is realized in that "upward shift" or "downward shift" signals are calculated with signs attached. For example, shifting bans are negatively assessed and shifting recommendations are identified by a positive sign (or vice versa). Furthermore, information about the priority of this intervention can also be inserted into the magnitude of the respective signal.

The fuzzy logic circuit 23 largely corresponds to the fuzzy logic control circuit described in the above-mentioned European patent application EP-A 0638742. However, the additions explained above are added to the rule base RB_shift. This means that the rules have different conclusions, depending on their priority, which is reflected in an allocation of different membership functions. Thus, the following rules apply to the downward shift:

a-RULE RS_curve_ban:
   if (ay is very_big)
   then down shift=RS_NH

This rule suppresses downward shifts in the event of high transverse acceleration. It is used to maintain driving stability and therefore has a high priority. (RS_NH means: allocation of a negative value with a large magnitude).

b-RULE braking_support
   if ax_br is NH
     and t_br is large
     and (mdiff is neg)
     and (nmot is less high)
   then down shift=RS_PL c-RULE RS_block
   if (sx is neg)
   then down shift=RS_NH d-RULE RS_cancel
   if (delta_dk is pos)
   then down shift=RS_NL Rule b has the effect that, given a braking operation of specific intensity ax_br and duration t_br, a downward shift is initiated. The variables ax_br and t_br are in this case made available to the fuzzy system. They are defined in the following way:

no braking operation: ax_br=0

$$\text{braking: } ax\_br = \frac{v_0 - v_t}{t\_br}$$

In this equation:

$v_o$ is the driving speed [m/s] at the beginning of the braking operation;

$V_t$ is the current driving speed [m/s]; t_br is the overall braking time [s] of the current braking operation.

Both the mean brake retardation ax_br and the braking time t_br running for this characterize the current braking operation. In addition, previous braking operations can be included by means of the braking frequency br_m, relating to a prescribed period (for the calculation thereof, see patent application EP-A 0626527). The premise "nmot is less high" prevents the motor being over-revved on severe gradients.

The conclusion of rule b is "RS_PL", which corresponds to a recommendation to shift down at low priority.

Rule d is intended to cancel rule b if the driver wishes to accelerate once more, which is shown by the accelerator pedal being pressed down (=opening the throttle).

The inference system of the fuzzy logic circuit 23 processes the rules which influence the output variable "down shift" in such a way that the relevance of the rules scales the magnitude of the associated area. For the purpose of defuzzification, the area center of gravity method is used. However, it is also possible to use other known methods of inference and defuzzification. The decisive factor is that, by means of allocating a suitable conclusion (area) and processing method, rule b is then neutralized by rule a, rule c or rule d and, in addition, rule a, rule c or rule d prevail in such a way that the fuzzy system outputs a negative value, as a result of which a downward shift is reversed or prevented. This is important in the example indicated, since supporting braking by shifting down does not take place or is terminated if there is brake slip at the driven wheels, or the vehicle is traveling through a curve in the limiting range. Specifically, if in this case a downward shift were nevertheless carried out, then it could cause the vehicle to skid.

A quantitatively different and differentiated decision ("down shift" signal) about the intervention of the dynamic shifting correction is only one further logical use of the potential of fuzzy methodology. It is also possible, by means of the "sharp" fuzzy output variable, to record the basic rule or the cause of the intervention via the level of the "sharp" numeric output variable from the fuzzy system.

Figure 4:
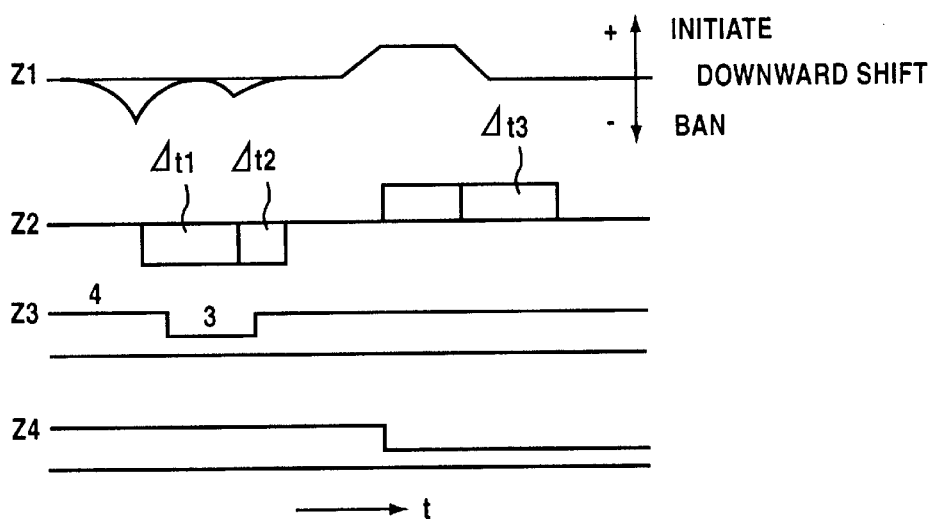
FIG. 4 is a timing chart view showing signals occurring in the fuzzy logic circuit of the transmission controller according to FIG. 2.

Hence, it is possible to realize a variable ban period which, even in the event of relatively short occurrence of interventions of the dynamic correction, maintains the latter over a time period of variable length. FIG. 4 reveals various signals that occur and are generated in the controller 6: a signal "down shift" correction is illustrated in a line Z1. This signal is transmitted on a line 32 (see FIG. 3). Illustrated in a line Z2 is a chronologically superimposed correction signal, which is transmitted on a line 33. Illustrated in a line Z3 is a signal gear selection in accordance with shifting characteristic map, which is transmitted on a line 34; and illustrated in a line Z4 is a signal determining the transmission gear to be activated, which signal is transmitted to the transmission on a line 33. The input signals, transmitted on a line 31, of the fuzzy logic circuit 23 are not illustrated here, but are described in the above-mentioned patent application.

In this case, the signal in line Z1 contains information about the type of dynamic correction intervention—here an active initiation of a downward shift, to be specific independently of a calculation in accordance with a shifting characteristic map—or else information about the type of prevention of downward shift commands from the shifting characteristic map that is currently active.

The timer 24 supplements the effectiveness of an intervention of this type when the effectiveness of a rule decays. Depending on the type of an intervention x, the timer makes a selection following a signal on the line 32, and appends a period Δtx, by which the effectiveness of the intervention originally predefined by the fuzzy logic circuit 23 is prolonged (by means of a signal on the line 33). The values for Δt are stored in the table 25. This leads to the suppression of a downward shift, as is output via the line 34 from a gear calculation in accordance with the shifting characteristic map 26. In other words, via the line 33, no downward shift command is now forwarded to the transmission. If, by contrast, a downward shift is prescribed by the fuzzy logic circuit 23, this is output on the line 33, independently of the controller 26.

However, using the table 25 it is also possible to break off a currently running (prolonged) intervention $\Delta tx$, for example to maintain the driving stability of the motor vehicle.

Conventional fuzzy systems contain no kind of time store, which has the consequence that conclusions or in general output signals of a fuzzy system are only defined by these (its rules and membership functions) and by the input signals that are present at the same instant. It is often necessary or expedient to define the conclusions and hence output signals of the fuzzy system in dependence on both the "prehistory" of the input signals and the conclusion in the preceding interval. In the first case, this is performed by filtering and averaging, or in general signal conditioning, of the input signals in the signal conditioning circuit 22.

In the second case this can take place such that the timer 24 prescribes one or more input variables in the manner of a replacement for the prescribed interval $\Delta tx$, as a function of the table 25. This may take place in the above rule b, in that even after the end of the braking operation the signal ax-br is set to a value as a result of which the rule is relevant when the other premises are satisfied, either only for the interval $\Delta tx$, or until another premise of the rule is no longer satisfied.

It is also possible to set $\Delta tx$ equal to "infinity" in a predefined case. This makes the timer 24 independent of time and stores a state A: in order to achieve this, a prescribed condition x must be signaled on the line 32 by the fuzzy logic circuit 23 as being satisfied (see also rule b). In order to leave the state A and to enter into a new state B, a further rule (for example rule a or c or d) must be true. Which rule is true can be specified by the signal on line 32, providing that no interaction takes place, for example an inference, via the fuzzy logic circuit.

Figures 5, 6:
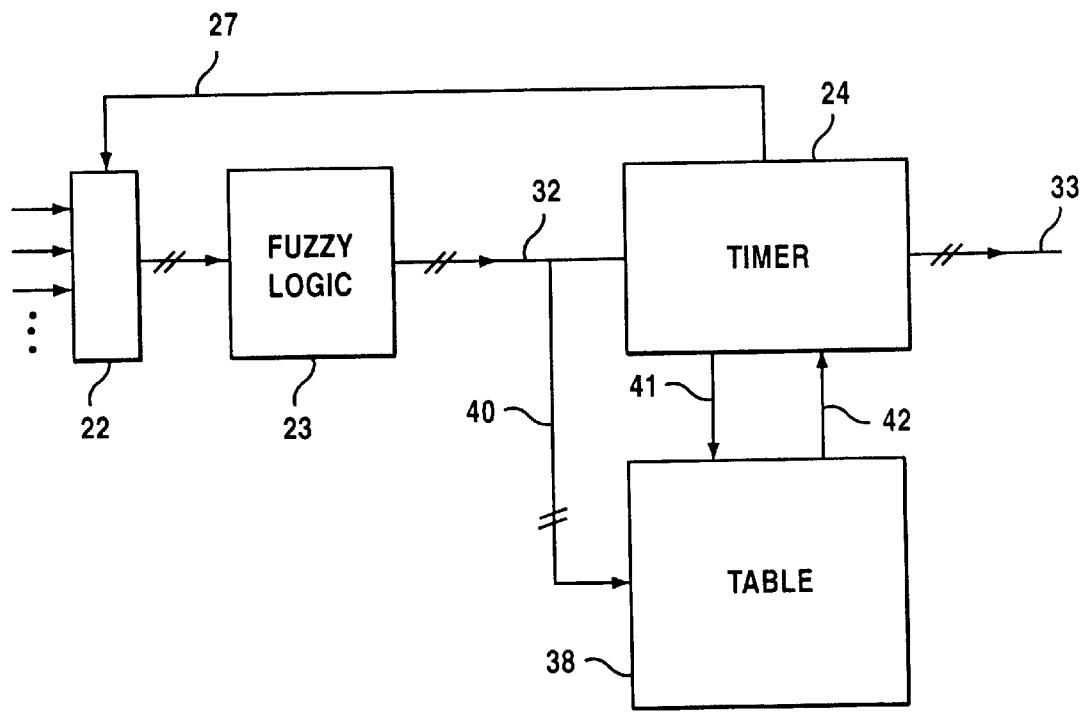
FIG. 5 is a block diagram of a transmission controller, expanded by a timer, of the motor vehicle according to FIG. 1.
FIG. 6 is a table used in the transmission controller according to FIG. 5.

FIG. 5 shows an expansion of the transmission controller 6 to form a sequential automaton having unsharp transition conditions. The fuzzy conclusions, i.e. the output signals occurring on the line 32 of the fuzzy logic circuit 23, serve as input value(s) for a table 38. Together with the current state n, they define a state n+1 and the associated process controlled values (here the gear to be engaged). The content of the table 38 is illustrated in FIG. 6. These process controlled variables can be defined in accordance with a dedicated regulation or correspond to specific conclusions of the fuzzy system. The table 38 is connected to the fuzzy logic circuit 23 and the timer 24 via signal lines 40, 41 and 42.

Also important is the acquisition, prefixed by a sign, of the slip sx of the driven wheels, which is required for rule c. Using it, both slip states in the event of a non-adapted engine power and smooth roadway can be determined (sign is positive), and the occurrence of brake slip, in which the force connection to the roadway during braking (with the operating brake or with the engine in braking operation) is lost (sign is negative). In this case, it is necessary to carry out an upward shift or else to cancel a downward shift command or a downward shift recommendation, such as for example as a result of rule b.

If a manual gear preset is provided in the motor vehicle (for example via a pushbutton on the steering wheel or a transmission selector lever), then its signals can be fed to the fuzzy logic circuit 23 via the signal conditioning 22. The fuzzy rule yielding a shifting command from this is, for example:

RULE manual_RS
  if RS_switch is on
    and (nmot is less_high)
  then down shift=RS_PL A low prioritization with RS_PL also has the effect here that this rule is ineffective in the case of driving states in which a downward shift would be detrimental to driving stability. A corresponding rule may be formulated in an analogous way for the manual initiation of an upward shift.

For a continuously variable transmission (see the commonly owned international application PCT/EP95/00135), the control structure explained above is likewise useful. This means that, by means of the fuzzy logic circuit 23, as established using the rule b, an existing transmission ratio is kept, or the range of transmission ratio shifts that are still possible is narrowed.

It is also possible, to carry out a transmission ratio correction by the prior removal of the preset from block 24 of the above patent application. Using this, it is likewise possible to set the braking effect of the engine in a deliberate manner when driving downhill, to be specific by prescribing the transmission ratio. A distinction between a preventive intervention and an active prescription is made via the sign, the prioritization as previously explained. In this case, the timer 24 is necessary in order to realize decisions of the fuzzy logic circuit 23, both in order to set a predefined transmission ratio and to correct presets from block 24 as a temporary supplementation (variable ban or intervention period), which, even in the event of a relatively short occurrence of interventions of the dynamic correction, maintains these over a period of variable length, specifically even when the entry conditions no longer apply.

The same distribution can be achieved if, via the line 27, a condition, that is to say an input signal for the fuzzy logic circuit 23, is changed, for a time defined in the table 38, in such a way that the conclusion is maintained during this time.

A manual intervention can likewise be implemented via a pushbutton input, however the shifting of the transmission ratio is then performed via changing the transmission ratio or the engine speed upward (downward shift) or downward (upward shift), the changes also being able to be carried out in relation to the values prior to the manual intervention.

We claim:

1. A motor vehicle transmission control for automatically controlling a transmission ratio in dependence on at least an accelerator pedal position and a driving speed of the motor vehicle, comprising:

a memory having characteristic maps stored therein;

a fuzzy logic circuit connected to said memory, said fuzzy logic circuit having a rule base for evaluating various signals characterizing driving states and a load state of the motor vehicle, said fuzzy logic circuit outputting control signals defining a transmission ratio of the motor vehicle transmission;

said fuzzy logic circuit, upon detecting a predetermined dynamic driving state of the motor vehicle, outputting a control signal for changing a gear ratio independently of a respective characteristic map; and said fuzzy logic circuit including in the control signal information about a priority of a change in the gear ratio to be effected.

2. The transmission control according to claim 1, wherein said fuzzy logic circuit, upon detecting wheel slip, generates a control signal effecting an upward shift in the transmission.

3. The transmission control according to claim 1, wherein said fuzzy logic circuit, upon detecting wheel slip, generates a control signal effecting a reduction in the transmission ratio.

4. The transmission control according to claim 1, wherein said fuzzy logic circuit, upon detecting downhill driving of the motor vehicle, generates a control signal effecting a downward shift in the transmission.

5. The transmission control according to claim 1, wherein said fuzzy logic circuit, upon detecting downhill driving of the motor vehicle, generates a control signal effecting an increase in the transmission ratio.

6. The transmission control according to claim 1, which further comprises a timer for maintaining the control signal generated by said fuzzy logic circuit for a predetermined period of time.

7. The transmission control according to claim 1, which further comprises a signal conditioning circuit receiving signals from the motor vehicle and outputting conditioned signals to said fuzzy logic circuit, and a timer chronologically influencing predetermined input signals of said signal conditioning circuit.

8. The transmission control according to claim 1, wherein said fuzzy logic circuit receives signals representing a manual gear specification or gear selection by a driver of the motor vehicle, and wherein said fuzzy logic circuit is programmed to evaluate the driver-generated signals and in response thereto issue the control signals for adjusting the gear ratio.

9. A controller for a device in a motor vehicle, comprising:

a memory having characteristic maps stored therein;

a fuzzy logic circuit connected to said memory, said fuzzy logic circuit having a rule base for evaluating various signals characterizing driving states and a load state of the motor vehicle, said fuzzy logic circuit outputting control signals defining a controlled variable of the motor vehicle;

said fuzzy logic circuit, upon detecting a predetermined dynamic driving state of the motor vehicle, outputting a control signal for changing a controlled variable independently of a respective characteristic map; and said fuzzy logic circuit including in the control signal information about a priority of a change in the controlled variable to be effected.

10. The controller according to claim 9, which further comprises a timer for maintaining the control signal generated by said fuzzy logic circuit for a predetermined period of time.

11. The controller according to claim 9, which further comprises a signal conditioning circuit receiving signals from the motor vehicle and outputting conditioned signals to said fuzzy logic circuit, and a timer chronologically influencing predetermined input signals of said signal conditioning circuit.

* * * * *